United States Patent
Hansen

(10) Patent No.: US 6,758,103 B2
(45) Date of Patent: Jul. 6, 2004

(54) MASS FLOW MEASURING APPARATUS AND METHOD OF MEASURING A MASS FLOW

(75) Inventor: Henning Max Hansen, Soenderborg (DK)

(73) Assignee: Siemens Flow Instruments A/S (DK)

( * ) Notice: Subject to any disclaimer, the term of this patent is extended or adjusted under 35 U.S.C. 154(b) by 0 days.

(21) Appl. No.: 10/194,726

(22) Filed: Jul. 12, 2002

(65) Prior Publication Data

US 2003/0033888 A1 Feb. 20, 2003

(30) Foreign Application Priority Data

Aug. 10, 2001 (DE) .......................................... 101 38 323

(51) Int. Cl.[7] .............................................. G01F 1/78
(52) U.S. Cl. .............................................. 73/861.357
(58) Field of Search ..................... 73/861.357, 861.355, 73/861.356

(56) References Cited

U.S. PATENT DOCUMENTS

| | | | | |
|---|---|---|---|---|
| 5,069,075 A | * | 12/1991 | Hansen et al. ......... | 73/861.357 |
| 5,637,804 A | * | 6/1997 | Hansen ................... | 73/861.18 |
| 6,591,693 B1 | * | 7/2003 | Mansfield et al. ..... | 73/861.356 |
| 6,647,807 B2 | * | 11/2003 | Drahm et al. .......... | 73/861.357 |

* cited by examiner

Primary Examiner—Edward Lefkowitz
Assistant Examiner—Jewel V. Thompson
(74) Attorney, Agent, or Firm—Altera Law Group, LLC

(57) ABSTRACT

A mass flow measuring apparatus (1) is described, having tube (2), which at a first position (P1) is coupled as regards oscillation to a first energy converter (4) and at a second position (P2) is coupled as regards oscillation to a second energy converter (5), and having an evaluating device, the first and the second position (P1, P2) being spaced (L) from one another, the energy converters (4, 5) each being operable as oscillation generator and oscillation detector and the energy converters (4, 5) working alternately as oscillation generators. A method can therefore be carried out in which the tube (2) is caused to oscillate alternately at the first position (P1) and at the second position (P2), signals being measured at the second and the first position (P2, P1). It is desirable to be able to achieve accurate measurements even in the case of a measuring apparatus of small construction. For that purpose, the energy converters (4, 5) are constructed as part of resonant circuits (6, 7; 8, 9) and the evaluating device determines a predetermined parameter of a sympathetic oscillation at the second energy converter (5) after excitation by the first energy converter (4) and the parameter of the sympathetic oscillation at the first energy converter (4) after excitation by the second energy converter (5).

16 Claims, 4 Drawing Sheets

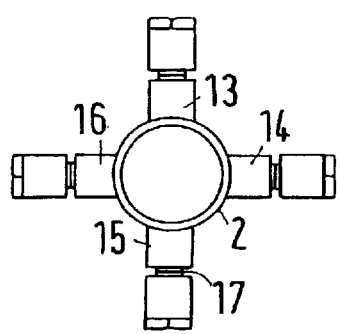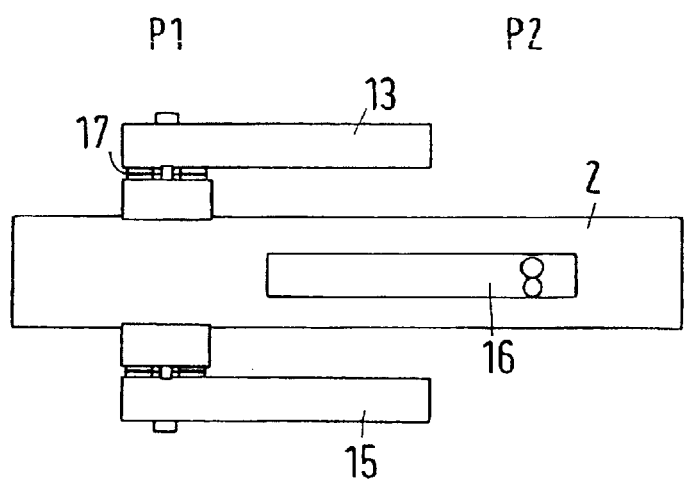

MASS FLOW MEASURING APPARATUS AND METHOD OF MEASURING A MASS FLOW

TECHNICAL FIELD

The invention relates to a mass flow measuring apparatus having a tube, which at a first position is coupled as regards oscillation to a first energy converter and at a second position is coupled as regards oscillation to a second energy converter, and having an evaluating device, the first and the second position being spaced from one another, the energy converters each being operable as oscillation generator and oscillation detector and the energy converters working alternately as oscillation generators. The invention relates furthermore to a method of measuring a mass flow through a tube that is caused to vibrate at a first position and at a second position alternately, signals being measured at the second and at the first position.

BACKGROUND

Such a mass flow measuring apparatus and such a method are known from DE 39 23 409 A1. The mass flow measuring apparatus described therein works in accordance with the Coriolis principle. The tube is set oscillating at the first position and the "response" at the second position is recorded. The tube is then set oscillating at the second position and the responses at the first position are recorded. From the difference between the propagation times of the waves in the one and in the other direction, conclusions can be drawn about the mass flow.

The principle has proved successful, but has the disadvantage that the wave propagation of the oscillations that have been used until now was very fast, so that the tube had to be very long in order to be able to achieve a time difference necessary for an accurate measurement.

In a paper by J. Hemp, "The Theory of Coriolis Mass Flowmeters", Cranfield Institute of Technology, Cranfield, England 29$^{th}$ to 30$^{th}$ Oct. 1987, a Coriolis mass flow measuring apparatus having a U-shaped tube is described, two energy converters being mounted on the tube. The energy converters operate alternately as oscillation generator and oscillation detector. In this case, the U-shaped tube is set permanently oscillating and oscillates at its natural frequency.

SUMMARY

The invention is based on the problem of achieving accurate measurements even with a measuring apparatus of small construction.

That problem is solved in the case of a mass flow measuring apparatus of the kind mentioned in the introduction in that the energy converters are constructed as part of resonant circuits and the evaluating device determines a predetermined parameter of a sympathetic oscillation at the second energy converter after excitation by the first energy converter and the parameter of the sympathetic oscillation at the first energy converter after excitation by the second energy converter.

In this construction, by the use of the resonant circuits and the sympathetic oscillations associated therewith, the time available for a measurement is "stretched". It is therefore possible, even with a relatively short measuring tube, to determine satisfactory differences between oscillation propagation in the one direction and oscillation propagation in the other direction. This difference is ultimately a measure of the mass flow through the tube. In this case, the following consideration is used as a starting point: an oscillation that is coupled into the tube propagates along the tube and in so doing reaches the oscillation detector. The tube is therefore caused to oscillate also in the region of the oscillation detector. It will nevertheless take a while for the tube to reach a steady state in the region of the oscillation detector, that is, to oscillate so that the oscillation there is comparable with the excitation oscillation. It is now possible to exploit this "time gain" to permit more accurate measurements. For measurement of the flow, use is made of the fact that the oscillations propagate not only via the tube but also via the liquid that is located in the tube and the mass flow of which is to be determined. The oscillation propagation can now be made in the one direction, that is, with the mass flow, and at the same time a parameter of the sympathetic oscillation can be evaluated at the oscillation detector. The oscillation can subsequently be allowed to run in the reverse direction and the sympathetic oscillation can be evaluated at the other oscillation detector. As is well known, conclusions about the mass flow can then be drawn from the propagation time differences. The corresponding differences can certainly be formed with greater accuracy because basically a longer time is available. Expressed in simple terms, the measuring principle is based on a comparison of the oscillation coupling by the tube with the oscillation coupling by the liquid in the tube.

Preferably, the tube causes a mechanical coupling between the first and the second position, in which a momentum conveyed by the tube is in the range of 10 to 1000 times greater than a momentum conveyed by the fluid in the tube. The momentum can also be called a pulse. In this way, the oscillation coupling by the liquid can be ascertained satisfactorily. It is virtually impossible to influence the oscillation coupling by the liquid, but the tube can be designed so that the said condition is fulfilled. For example, a tube of metal having a low modulus of elasticity can be used, or a tube having a thin wall. The greater is the "hydraulic coupling", that is, the oscillation coupling by the fluid in the tube compared with the oscillation coupling by the tube itself, the more significant are the differences when detecting the oscillation in the one and in the other direction, that is, with and against the flow through the tube.

In this connection it is preferred that coupling of the two resonant circuits lies in the region of a so-called critical coupling. In this region, the coupling is adapted so that the one resonant circuit just impacts on the other. If the coupling is overcritical, the oscillation energy will migrate back and forth between the two. If it is less than the critical coupling, there will be no impact on the resonant circuit to be excited.

Preferably, excitation is time-limited. For example, 30 measurements per minute can be taken. Subjecting the excitation to a time limit ensures that oscillation propagation in the one direction and oscillation propagation in the other direction can be determined sufficiently often.

Preferably, the parameter is a predetermined amplitude of an oscillation envelope that can be tapped off at the oscillation detector. Starting from a non-oscillating tube, after the tube has been caused to oscillate at the first position, an oscillation will develop on the resonant circuit that is arranged at the second position, the oscillation having an amplitude that increases over time until this oscillation, which is also called the "sympathetic oscillation", has the maximum amplitude, the maximum amplitude in turn being determined by the excitation energy at the first position. If the envelope of the sympathetic oscillation is now formed, it is observed that the amplitude of this envelope increases over time. The length of time taken until the envelope reaches a specific amplitude can now be measured, and this time can be used as propagation time substitute for the propagation of the oscillation in the one direction or in the other direction.

In this connection, the evaluating device preferably has a threshold control and a comparator. By means of the threshold control, it is possible to pre-set the threshold at which, when it is exceeded, which can be ascertained by means of the comparator, a time can be measured.

In an alternative construction, the parameter can be a phase difference between the sympathetic oscillation and another oscillation. This phase difference can be determined, for example, by monitoring passages of the corresponding oscillations through zero. In this case, it is assumed that between the, sympathetic oscillation and the excitation oscillation a phase shift has generally occurred, which can be used as criterion for the oscillation propagation and hence as measuring time for determining the mass flow. The magnitude of the phase shift is amplified by the resonant circuits used. This amplification is based on the fact that the oscillations transmitted through the fluid are out of phase by 90° compared with the oscillations transmitted through the tube. The resonant circuit is therefore-triggered or excited by two oscillations that are out of phase. This leads to a flow-dependent phase shift of the sympathetic oscillation.

In this connection, the evaluating device preferably has at least one memory device, in which a sympathetic (i.e. resonant) oscillation or a part thereof can be stored. The sympathetic oscillation is then available in its time characteristic for subsequent evaluation.

In this connection, a comparator is preferably provided, which compares an actual sympathetic oscillation with an exciting signal or with the stored sympathetic oscillation. Direct comparison of two oscillations enables a phase angle between the two oscillations to be established relatively accurately, whereby it is possible to determine the mass flow with great accuracy. The actual sympathetic oscillation also need not necessarily be evaluated at the instant of its appearance. It too can be sampled and stored.

The resonant circuits preferably comprise multi-mass oscillators, an outer mass being constructed as the largest mass. By this means, the oscillations on the tube have a preferred direction. The largest mass of each oscillation generator serves in this connection as "isolator", even though oscillations will naturally be observed also on the other side of the largest mass.

Between the first position and the second position, a third resonant circuit is preferably coupled as regards oscillation with the tube. A further delay in or stretching of the measuring time can therefore be achieved. An oscillation of the tube and the liquid located therein that is generated at the first position sets the tube and the fluid located therein oscillating first of all at the third resonant circuit, a transient phenomenon also being observed here. The oscillation will not propagate to the energy converter at the second position until the third resonant circuit has reached maximum oscillation; it is, nevertheless, to be observed that development of the sympathetic oscillation at the second position takes longer when a third resonant circuit is arranged in the path between the first and the second position.

In a method of the kind mentioned in the introduction, the problem is solved in that the signals are in The form of sympathetic oscillations and a parameter of the sympathetic oscillation at the first position, and the same parameter of the sympathetic oscillation at the second position are used to determined the flow.

As stated above, more time or a more accurate resolution is available for determining the propagation times between the first and the second positions or between the second and the first positions, that is, in the direction of flow and in the direction against the flow. The tube can therefore be kept short, without having to sacrifice measuring accuracy.

The amplitude of an envelope of the sympathetic oscillation is preferably used as parameter. The measure of how quickly the sympathetic oscillation builds up is a measure of the mechanical coupling between the first and the second positions and between the second and the first positions. The mechanical coupling is based on the one hand on the oscillation coupling by the tube and on the other hand on the oscillation coupling by the liquid. The oscillation coupling by the liquid is dependent on the direction of flow and the mass flow through the tube, however. By comparing the measurements in the direction of flow and in the direction against the flow, sufficient information can be gained to obtain the mass flow through the tube.

Alternatively, a phase difference between the actual sympathetic oscillation and the excitation oscillation or a stored, previous sympathetic oscillation can be used as parameter. Such a phase difference can be determined relatively accurately when both oscillations are, as it were, available at the same time.

Preferably, an excitation circuit frequency of the order of magnitude of $$\omega_{ex} = \sqrt{\frac{E \cdot I}{k_1 \cdot \rho_{tube} + k_2 \cdot \rho_{liquid}}}$$

is chosen, in which $\omega_{ex}$ is the excitation circuit frequency, $\rho_{tube}$ and $\rho_{liquid}$ are the density of the tube and liquid respectively and $k_1$ and $k_2$ are constants that depend on the flow measuring apparatus, E is the modulus of elasticity of the tube and I is the bending moment of inertia of the tube. In this way, the best possible transfer between the oscillation exciter and the oscillation detector is obtained, so that the loss of information remains relatively small. In this connection, it is not absolutely necessary to meet the above-mentioned excitation circuit frequency exactly, it the circuit frequency is met at least in respect of order of magnitude. The excitation frequency should lie within the bandwidth of the resonant circuits.

BRIEF DESCRIPTION OF THE DRAWINGS

The invention is described in the following with reference to preferred exemplary embodiments in combination with the drawings, in which

FIGS. 7a & b shows a fourth exemplary embodiment of a mass flow measuring apparatus in side and top views respectively.

DETAILED DESCRIPTION

Figure 1:
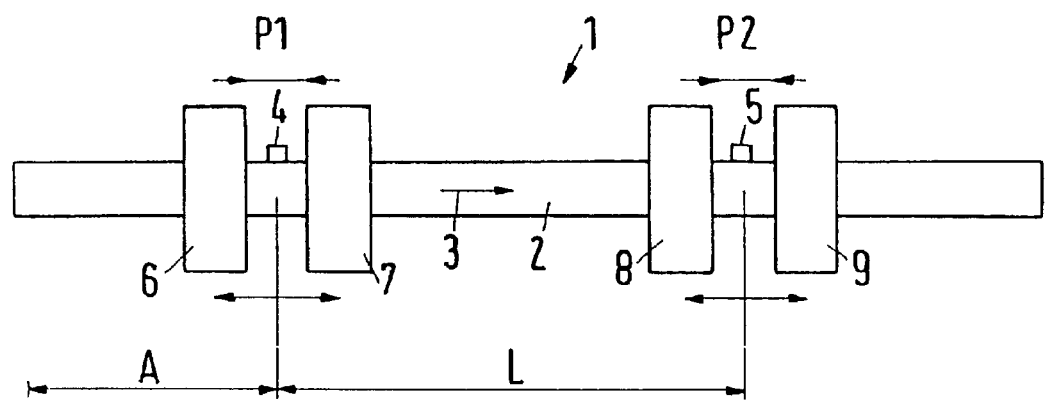
FIG. 1 shows a first exemplary embodiment of a mass flow measuring apparatus.

FIG. 1 shows a schematic illustration of a mass flow measuring apparatus 1 having a tube 2, through which a fluid, especially a liquid, flows in the direction of an arrow 3

A first energy converter 4 is fastened to the tube 2 at a first position P1 and a second energy converter 5 is fastened to the tube 2 at a second position P2, such that the energy converters 4, 5 can transfer oscillations to the tube 2 and can detect oscillations of the tube 2. The two energy converters 4, 5 are therefore operable both as oscillation generators and as oscillation detectors.

Between the first position P1 and the second position P2 there is a spacing L. The spacing from the position P1 to a fixing point, not illustrated, of the tube 2 has a dimension A. The spacing A to the fixing point must not be selected to be too small, otherwise the tube 2 becomes too rigid.

In the region of each of the energy converters 4, 5 there are arranged respective spring-mass systems, which consist of two masses 6, 7 and 8, 9 respectively, which in this particular case are in the form of beams. Each pair of masses 6, 7; 8, 9 forms, in combination with the energy converter 4, 5 and the tube 2, a resonant circuit. The excitation frequency of the energy converters 4, 5 is matched substantially to the resonant frequencies of the two resonant circuits, which incidentally are the same. The tube 2 and the inner one of the masses, 6, 7 and 8, 9 respectively, act as a spring and the outer part of the beam-form mass, 6, 7 and 8, 9 respectively, acts as a mass. This illustration is intended to facilitate understanding of the concept. Of course, all of the masses 6–9 act as masses. In the present case, this construction has the result that the tube 2 is subjected to flexural oscillations. Basically, however, many other kinds of oscillations are also conceivable, for example, also oscillations that influence the cross-section of the tube 2, such as ovality oscillations, peristaltic oscillations or other oscillations perpendicular to the tube axis.

As stated above, the energy converters 4, 5 can operate both as oscillation exciters and as oscillation detectors. They can be of an electromagnetic or piezoelectric type. Magnetostrictive, capacitive, pneumatic, hydraulic, bimetallic-thermic or other energy converters that can work both as exciters and as sensors are also possible.

As shown, the energy converters are fixed directly on the tube 2. Alternatively, the energy converters 4, 5 can be fixed to the masses 6, 7 and 8, 9 respectively.

Figure 2:
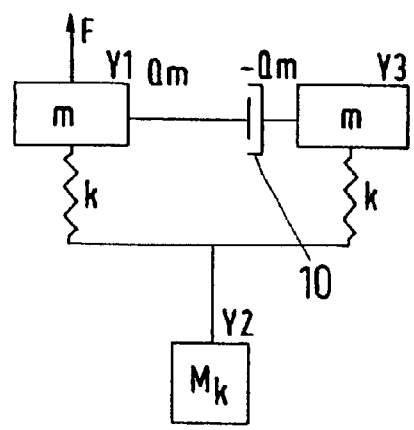
FIG. 2 shows a spring-mass system for explanation of the first exemplary embodiment.

The spring-mass system illustrated can be called a mechanical resonant system. The schematic arrangement shown in FIG. 1 has been redrawn as a spring-mass system in FIG. 2. Here, m stands for the mass of the masses 6, 7 and 8, 9, and k for a spring constant, that is, the stiffness. The two resonant circuits at the position P1 and the position P2 are coupled with one another via two paths: firstly, by the tube 2 itself, that is, by the wall thereof. This coupling is denoted by a common mass Mk. Since this coupling is very large, it is drawn in undamped. Secondly, coupling is effected by the liquid in the tube 2. Since this coupling is very small, a viscous damping element 10 has been drawn in.

Coupling by the tube 2 is substantially greater than coupling by the liquid. Using suitable means, however, it is possible to ensure that coupling by the tube 2 is greater by a maximum factor of 100 than coupling by the liquid.

Coupling by the liquid in the tube 2 consists of two contributory components, namely, firstly, the desired flow-dependent coupling and, secondly, the non-flow-dependent coupling, that is, a coupling that would occur even with the liquid stationary.

The desired mass flow is denoted by Qm and F indicates a force that acts on the mass m in the resonant circuit Y1. To simplify the following explanation, it is assumed that this force "impacts on" the resonant circuit Y1, that is, excites it quasi-intermittently. In reality, however, an oscillation will act on the first resonant circuit Y1 over a limited period, for example, in the range of from 1 to 10 milliseconds.

When there has been an impact on the resonant circuit Y1, the following happens: a sympathetic oscillation occurs and propagates, namely, through the liquid on the one hand and through the tube 2 on the other hand. The oscillations do reach the second resonant circuit Y3 relatively quickly, but since the second resonant circuit Y3 must first build up its oscillations, it takes a certain time before the resonant circuit Y3 is oscillating at the corresponding amplitude. This is illustrated schematically in FIG. 3. The first line shows a signal ST, that is, the excitation signal that is supplied, for example, by the energy converter 5. Below that, a signal SG is shown, which the energy converter 4 then receives. The signal SG is the oscillation transmission opposite to the direction of flow 3. For the sake of completeness, a signal SM is shown in the last line. This is the signal that can be tapped off at the energy converter 5 when the energy converter 4 is the exciter. SM is the signal with the flow 3.

When the energy converters 4 measure electromagnetically, then under certain circumstances it is not the corresponding signal SG, SM that is determined, but the time derivative thereof. For the sake of simplicity, however, for the following consideration the signals SG, SM illustrated in FIG. 3 will be discussed.

In the two sympathetic oscillation signals SG, SM, an envelope EG, EM has been additionally drawn in. One can now measure, for example, when the envelope EG and the envelope EM exceed a predetermined threshold value. The time from the start of excitation, that is, from the start of signal ST, to the time at which the envelope EG exceeds the threshold value is denoted by $T_L$. The time from the start of the signal ST (this time emitted from the other energy converter) to the time at which the envelope EM exceeds the same threshold value is denoted by $T_R$.

The mass flow can be determined in accordance with the following formula:

$$Qm = k_{(\rho)} \cdot \frac{T_R - T_L}{T_R + T_L}$$

Here, Qm is the mass flow, $k_{(\rho)}$ is a constant that depends on the coupling between the oscillating systems and possibly also on the density ρ of the liquid.

Since it is assumed that there is a clear correlation between ρ and $T_R$ and $T_L$, it is also possible to determine ρ, thereby making further valuable information available to the user of the flowmeter. If applicable, there can also be provision for the correlation between T and ρ to be compensated.

It is also assumed that the measurement is based on the following principle: a part of the coupling between the oscillating systems is effected by oscillations in the liquid. An oscillating liquid contains a momentum, that is to say, a pulse, which is conveyed onwards with the flow. When the liquid flows through one of the oscillating systems, part of the momentum is carried with the current, the oscillation being damped. At the same time, an oscillating liquid that is passing through an oscillating or oscillatable system delivers kinetic energy to the system, whereby an oscillation is built up there. When the remaining coupling between the transmitter, that is, the oscillation exciter, and the receiver, that is, the oscillation detector, is not too strong, then the flow-assisted coupling has relatively great significance. This applies only for as long as the mechanical coupling by the tube is not too great, of course. It is therefore advantageous to ensure that the hydraulic coupling, that is, coupling via the liquid, is as large as possible. The mechanical coupling can be kept small by using a tube 2 that consists of metals having a relatively low modulus of elasticity or by the use of a tube 5 that has a thin wall.

Briefly, the measuring principle is therefore based on a comparison of the coupling by the tube 2 and the coupling by the liquid. As is clear in conjunction with FIG. 3, this effect is primarily visible in the rate of rise of the envelopes EG and EM. By a comparison of this rate of rise during oscillation transfer with the direction of flow and against the direction of flow, the mass flow can be calculated.

Figure 3:
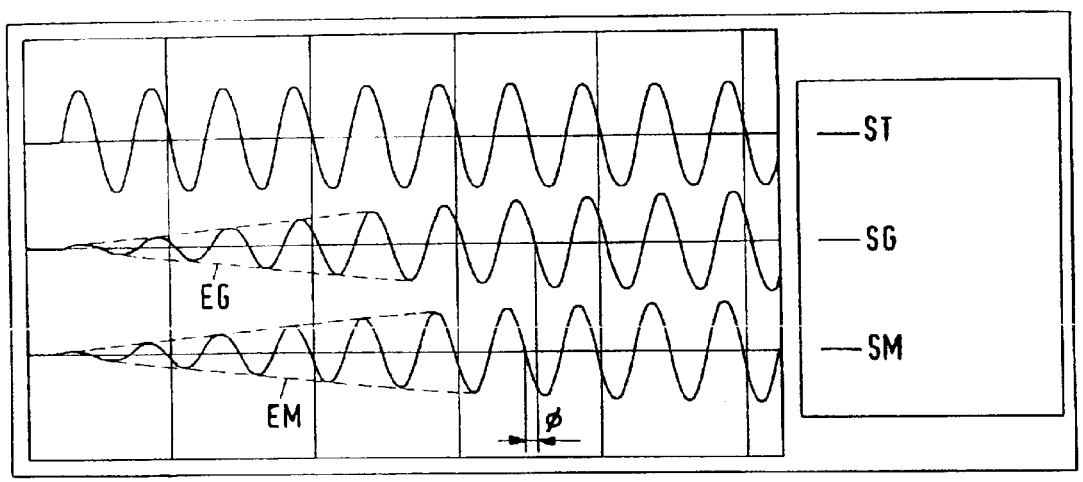
FIG. 3 shows the time characteristic of oscillations.
Figure 4:
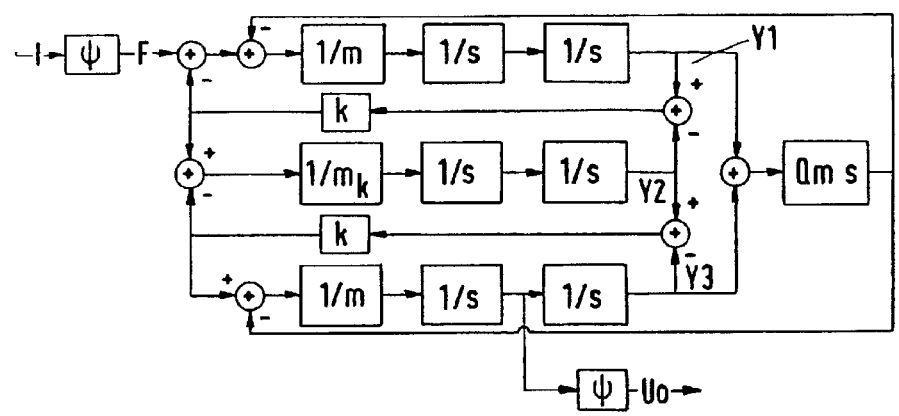
FIG. 4 is a block circuit diagram.

A further possible method of calculating the mass flow is shown in FIG. 3, using the phase angle φ. For that purpose, starting from FIG. 2. a block diagram has been developed, which is shown in FIG. 4. This block diagram contains Laplace operators. Using these Laplace operators, the mass flow Om can be determined according to the following formula:

$$Qm = \frac{-\tan\Phi}{\frac{-2}{k^2}\omega^3 \cdot Mk + \frac{4}{k}\cdot\omega}$$

in which φ is the phase difference shown in FIG. 3 between Y1 and Y3, ω is the transmit frequency of a circuit and Mk is the mass of the tube 2.

Note that ω need not necessarily be the resonant frequency. It is advantageous, however, for ω to correspond at least substantially to this resonant frequency. Variations within the bandwidth of the resonant circuits are admissible.

The resonant frequency $\omega_{res}$ of a resonant circuit Y1, Y3 is determined by the following formula:

$$\omega_{res} = \sqrt{\frac{E \cdot I}{k_1 \cdot \rho_{tube} + k_2 \cdot \rho_{liquid}}}$$

in which $\rho_{tube}$ and $\rho_{liquid}$ are the densities of the tube 2 and the liquid respectively. $k_1$ and $k_2$ are constants, which depend on the construction and the dimensions of the particular measuring apparatus 1. E is the modulus of elasticity of the tube 2 and 1 is the bending moment of inertia of the construction. E may possibly be dependent on temperature and must optionally be compensated if the temperature is not kept constant.

There are several possible ways to determine the phase angle φ, two of which will be described below:

Firstly, the signal against the direction of flow 3 can be sampled and stored. The signal SM in the direction of flow is then sampled and stored and the phase angle φ is calculated from the two stored curves. In the present case, the phase angle φ is the difference between two passages through zero. In principle, the second sampling and storage can be omitted if the second signal SM is compared so to speak directly with the stored signal SG. But since the second signal must also be sampled and stored for the subsequent comparison anyway, it is not particularly important whether a comparison is carried out directly or using stored signals.

In the second alternative, the received signal SG, SM is compared with the transmitted signal ST: first, the passages through zero of the counter-flow signal SG and the transmitted signal ST are compared, and a first phase difference is calculated. Then, the passages through zero of the with-flow signal SM and the transmitted signal ST are compared and a second phase difference is calculated. Finally, the first and the second phase differences are subtracted to determine the phase angle φ sought.

Figure 5:
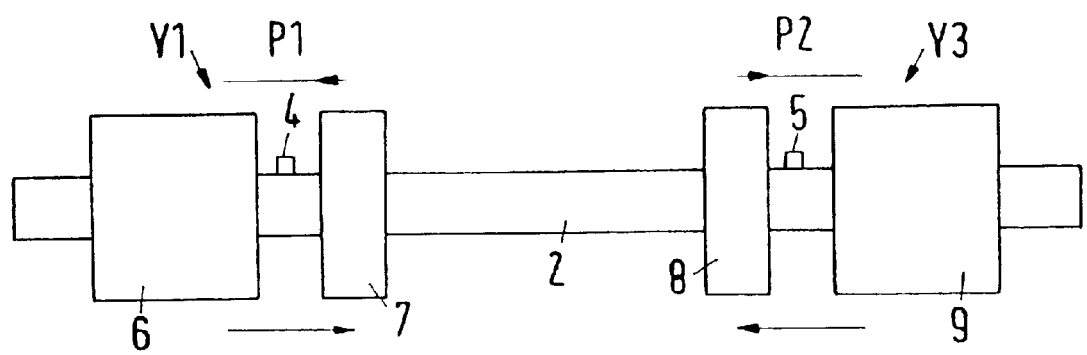
FIG. 5 shows a second exemplary embodiment of a mass flow measuring apparatus.

FIG. 5 shows a modified embodiment, in which identical parts have been provided with the same reference numerals as in FIG. 1.

Unlike the construction of FIG. 1, the respective outer masses 6, 9, that is, the masses 6, 9 that are adjacent to the fixing, are substantially larger than the "inner" masses 7, 8 that are located adjacent to the tube section between the two positions P1, P2. As a result, on excitation by the energy converters 4, 5, the oscillations are introduced chiefly into the tube section between the positions P1, P2 and oscillation to the ends of the tube 2 is damped to a greater or lesser extent. This makes the behaviour of the tube 2 at the points of fixation of its ends less critical. Basically, with appropriately chosen ratios between the masses 6, 7 and 8, 9 it can be assumed that the oscillations are coupled into the tube 2, preferably in one direction, namely, in such a way that the oscillations run towards the respective other energy converter 4, 5.

Figure 6:
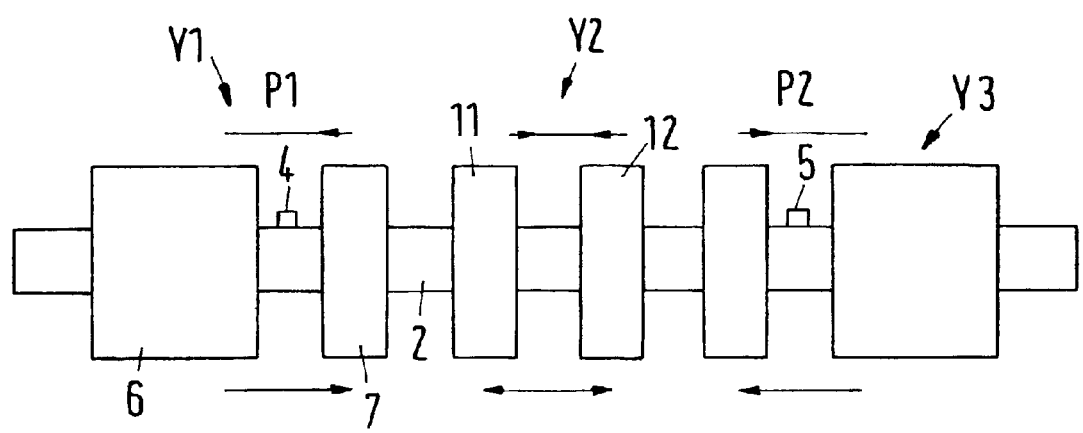
FIG. 6 shows a third exemplary embodiment.

FIG. 6 shows a third construction, in which, to expand the construction in FIG. 5, a further resonant system Y2 having two masses 11, 12 is arranged in the section of the tube 2 between the first position P1 and the second position P2. Identical parts to those in FIG. 5 have been provided with the same reference numerals.

The additional resonant system Y2 comprises the masses 11, 12, which are likewise coupled as regards-oscillation to the tube 2. An energy converter as in the first or second resonant system Y1, Y3 is not required.

The construction according to FIG. 6 can be explained as follows: an oscillation that is excited, for example, by the energy converter 4 propagates via the tube 2 and the liquid located therein first of all to the additional resonant system Y2. Only when this resonant system Y2 has been sufficiently excited can the oscillation continue to propagate further to the resonant system Y3 at the second position P2. Additional time is therefore gained, that is, the formation of a time difference can be effected with greater accuracy.

FIGS. 7a & b shows a construction in which ovality oscillations are imparted to the tube 2. Four inertial arms are mounted on the tube 2. The inertial arms 13–16 are caused to oscillate in pairs by means of piezoceramic discs 17. Opposite inertial arms 13, 15 and 14, 16 form one pair. One pair is fixed to the tube 2 at position P1. The other pair is fixed to the tube at position P2. It is quite admissible for the individual pairs of inertial arms not to be fixed to the tube 2 at the same circumferential position, because the tube is given an oscillation that changes its cross-section.

Integration of the resonant circuits and the energy converters results in a relatively small mass flow measuring apparatus.

Deformation of the tube propagates from one inertial arm pair 13, 15 to the other 14, 16 in the lengthwise direction of the tube. The coupling varies with the spacing between the resonant circuits, when, as here, ovality oscillations are used. A suitable spacing must be chosen so that the coupling is matched to the quality of the resonant systems.

The resonant frequency of the two "tuning forks" is located in the range between 100 Hz and 10 kHz. By changing the resonant frequency, it is possible to achieve an adaptation to the behaviour of the measuring apparatus.

What is claimed is:

1. Mass flow measuring apparatus having tube, which at a first position is coupled by oscillation to a first energy converter and at a second position is coupled by oscillation to a second energy converter, and having an evaluating device, the first and the second position being spaced from one another, the energy converters each being operable as oscillation generator and oscillation detector and the energy converters working alternately as oscillation generators, wherein the energy converters are constructed as part of resonant circuits and the evaluating device determines a predetermined parameter of a sympathetic oscillation at the second energy converter after excitation by the first energy converter and the parameter of the sympathetic oscillation at the first energy converter after excitation by the second energy converter.

2. Measuring apparatus according to claim 1, wherein the tube creates an energy coupling between the first and the second position, in which a momentum transported by the tube is in the range of 10 to 1000 times greater than a momentum transported by the fluid in the tube.

3. Measuring apparatus according to claim 1, wherein coupling of the two resonant circuits lies in the region of critical coupling sufficient to have the circuits impact each other generally without migration of energy between the circuits.

4. Measuring apparatus according to claim 3, wherein excitation is time-limited.

5. Measuring apparatus according claim 4, wherein the parameter is a predetermined amplitude of an envelope of an oscillation that can be tapped off at the oscillation detector.

6. Measuring apparatus according to claim 5, wherein the evaluating device has a threshold control and a comparator.

7. Measuring apparatus according to claim 4, wherein the parameter is a phase difference between the sympathetic oscillation and another oscillation.

8. Measuring apparatus according to claim 7, wherein the evaluating device has at least one memory device, in which a sympathetic oscillation or a part thereof can be stored.

9. Measuring apparatus according to claim 7, wherein a comparator is provided, which compares an actual sympathetic oscillation with an exciting signal or with the stored sympathetic oscillation.

10. Measuring apparatus according claim 9, wherein the resonant circuits comprise multi-mass oscillators, an outer mass being constructed as the largest mass.

11. Measuring apparatus according to claim 10, wherein between the first position and the second position, a third energy converter is coupled by oscillation with the tube.

12. Method of measuring a mass flow through a tube that is caused to vibrate at a first position and at a second position alternately, signals being measured at the second and at the first position, wherein the signals are in the form of sympathetic oscillations and a parameter of the sympathetic oscillation at the first position and the same parameter of the sympathetic oscillation at the second position are used to determined the flow.

13. Method according to claim 12, wherein the amplitude of an envelope of the sympathetic oscillation is used as parameter.

14. Method according to claim 12, wherein a phase difference between the actual sympathetic oscillation and the excitation oscillation or a stored, previous sympathetic oscillation is used as parameter.

15. Method according to claim 12, wherein an excitation circuit frequency $\omega_{ex}$ of the order of magnitude of $$\omega_{ex} = \sqrt{\frac{E \cdot I}{k_1 \cdot \rho_{tube} + k_2 \cdot \rho_{liquid}}}$$

is chosen, in which ωex is the excitation circuit frequency, $\rho_{tube}$ and $\rho_{liquid}$ are the density of the tube and liquid respectively and $k_1$ and $k_2$ are constants, E is the modulus of elasticity of the tube and I is the bending moment of inertia of the arrangement.

16. Method according to claim 15, wherein the oscillation excitation is restricted to short time segments.

* * * * *